Patented Aug. 10, 1926.

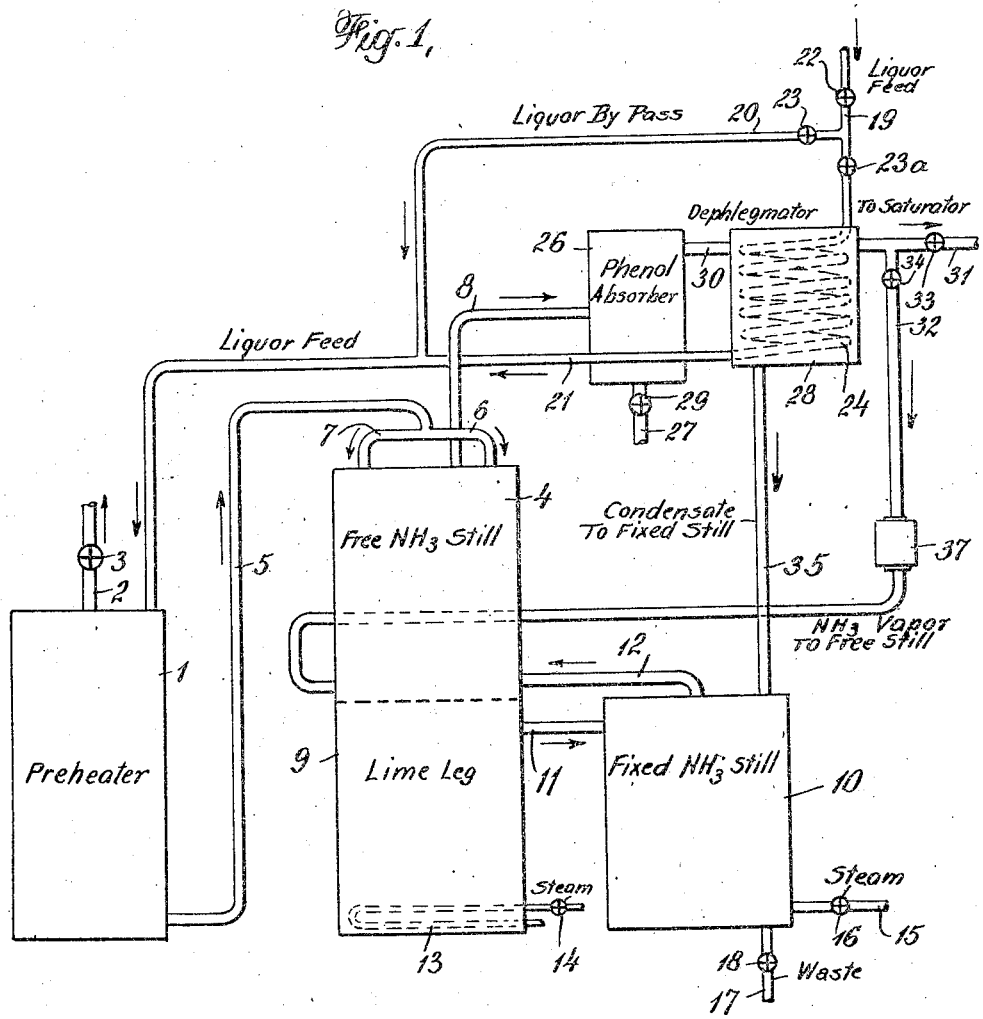

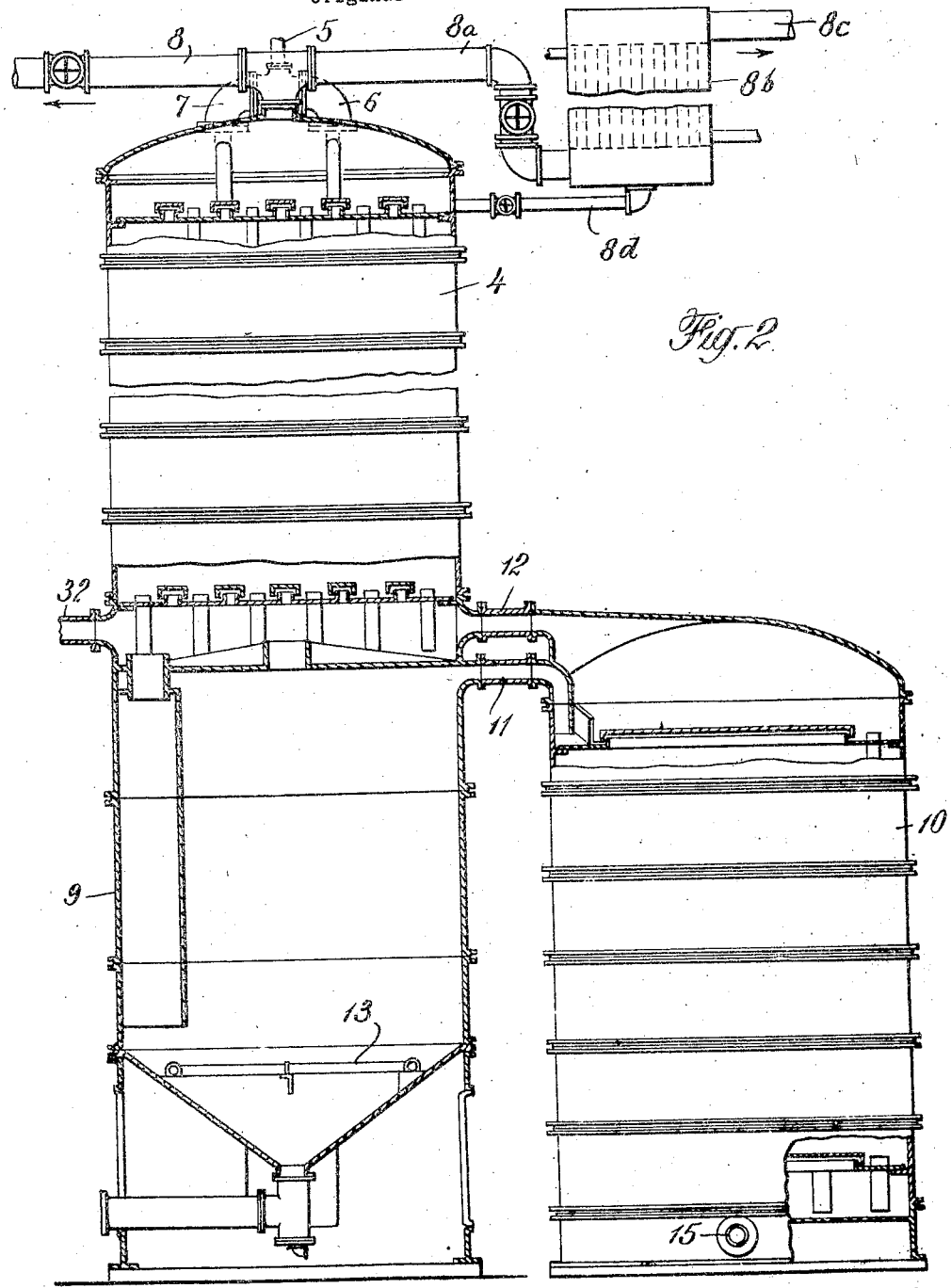

1,595,602

UNITED STATES PATENT OFFICE.

LE ROY WILBUR HEFFNER, OF EAST NORRISTOWN TOWNSHIP, MONTGOMERY COUNTY, AND WILLIAM TIDDY, OF JEFFERSONVILLE, PENNSYLVANIA, ASSIGNORS TO RAINEY-WOOD PROCESS CORPORATION, OF NEW YORK, N. Y., A CORPORATION OF DELAWARE.

APPARATUS FOR TREATING GAS LIQUOR.

Original application filed December 16, 1924, Serial No. 756,193, Patent No. 1,566,795. Divided and this application filed December 22, 1925. Serial No. 77,099.

The present invention relates to an improved apparatus for the treatment of gas and ammoniacal liquor from gas plants or coke furnaces, etc. This invention relates particularly to an apparatus for carrying out the process described in our application Serial No. 756,193 filed December 16, 1924 and is a division of said application now Patent No. 1,566,795.

The accompanying drawings illustrate apparatus embodying the invention.

Fig. 1 shows a somewhat diagrammatical form and arrangement of the apparatus. Fig. 2 shows on an enlarged scale one form of the ammonia still itself.

Referring first to Fig. 1, it will be seen that the apparatus includes the preheater 1 for the gas liquor with a release pipe 2 having valve 3 therein, and with an outlet pipe 5 for conveying the gas liquor to the top of the free ammonia still 4 into which it enters through the branch pipes 6 and 7. The vapor or ammonia outlet pipe from the free ammonia still is indicated at 8. The still has the usual lime leg 9 which is connected with the fixed ammonia still 10 through the pipe 11. The ammonia gas from the fixed ammonia still passes through the pipes 12 to the free ammonia still in the usual way. The lime leg is provided with a heating coil 13 having steam regulating valve 14; while the fixed ammonia still has a steam supply pipe 15 with controlling valve 16 therein. The waste liquor from the fixed ammonia still is drawn off through the pipe 17 having control valve 18 therein. The apparatus thus far described may be the same as the ordinary ammonia still, or the still may be modified, e. g., as illustrated in Fig. 2.

The supply of gas liquor enters through the pipe 19 and through one or the other or both of the branch pipes 20 and 21 to the preheater. Suitable regulating valves 22, 23, and 23ª are provided. The branch pipe 21 has a coil 24 arranged in the dephlegmator 28 to cool the gases passing therethrough, the liquor being itself somewhat heated in this way.

The vapors from the ammonia still enter the phenol absorber 26 which may be of any suitable construction to bring the gases into intimate contact with the absorbent. For example, an alkali solution may be provided in this washer. The washer has an outlet pipe 27 with control valve 29 therein for drawing off the alkali phenolate solution. The ammonia gas after purification passes through the pipe 30 to the dephlegmator 28 where the gases are cooled and water vapor is largely separated. The ammoniacal liquor thus condensed may be returned through the pipe 35 to the fixed ammonia still 10.

After passing through the dephlegmator 28, the ammonia gas, freed from a considerable portion of its admixed water vapor, passes through the pipe 31, having valve 33 therein, to the saturator or absorber. A part of this gas may be returned through the pipe 32, having valve 34 therein, to the bottom of the free ammonia still, a suitable pump 27 being provided for forcing this ammonia into the free ammonia still.

One suitable form of ammonia still is illustrated more in detail in Fig. 2, the general features of this still being indicated by the same reference characters used in Fig. 1. The free ammonia still 4 and the fixed ammonia still 10 are made up of suitable baffle arrangements for insuring that the ammonia will be progressively driven off from the liquor. The free ammonia driven off from the fixed ammonia still passes through the pipe 12 into the lower part of the free ammonia still and passes upwardly countercurrent to the hot liquor flowing downwardly through this portion of the still. By introducing additional ammonia through the pipe 22, the amount of ammonia passing upwardly through this still can be increased sufficiently to insure that all or substantially all of the phenols and tar acids are driven off when the proper temperature is maintained. The gas liquor from the bottom of the free ammonia still passes down through the lime leg where the reaction with lime takes place, and the liquor then flows to the fixed ammonia still where the ammonia set free is driven off.

It will be noted that the upper or free ammonia section of the still of Fig. 2 is broken away to indicate a still of indefinite height. Instead of being of usual height, additional sections may be provided to give an increased opportunity for the preheated gas liquor to come into contact with the ammonia vapors.

The upper portion of the free ammonia still becomes a countercurrent scrubber, and, by maintaining the gas liquor at a sufficiently high temperature, above 98° C., the removal of a considerable portion of the ammonia and phenolate will take place before the liquor reaches the lower portion of the free ammonia still, while the added ammonia from the fixed ammonia still, or recycled after purification to the bottom of the free ammonia still, will complete the driving off of the phenolic compounds as phenolates.

In Fig. 2, two outlet pipes, 8 and 8ª, are indicated for the ammoniacal vapors escaping from the still. The outlet pipe 8 permits all of the vapors from the still to pass to the phenol absorber, as illustrated in the arrangement of Fig. 1. The outlet pipe 8ª is connected with a dephlegmator by means of which the temperature of the ammoniacal vapors can be somewhat reduced before these vapors pass to the phenol absorber. In the operation of the ammonia still, the temperature may be maintained considerably above 98° C. and even above 103° C. Particularly at the latter and higher temperatures, a large amount of water vapor comes off with the ammonia. By cooling the vapors to a temperature below 103° C., i. e., between 103° C. and 98° C., a considerable portion of the excess water vapor can be condensed from the vapors before they pass to the phenol absorber. In the apparatus of Fig. 2, the outlet pipe 8ª leads to a reflux cooler or dephlegmator 8ᵇ, from which the cooled vapors escape at 8ᶜ and the reflux condensate is returned to the ammonia still through the pipe 8ᵈ. Suitable valves in the pipes 8, 8ª and 8ᶜ permit controlling the flow of vapors so that they pass either through the outlet pipe 8 or through the outlet pipe 8ª and dephlegmator. The dephlegmator may be cooled by water which is regulated in amount and temperature so that the vapors are not cooled below 98° C., thereby preventing recondensation or reabsorption of phenolate.

In the apparatus illustrated, the ammonia stills may be operated in much the usual way, but with a higher temperature in the free ammonia still and particularly at its outlet, and also ammonia is introduced, if necessary into the free ammonia still in sufficient amount to insure that all or substantially all of the phenols are removed with the ammonia.

The admixed vapors from the ammonia still pass to the purifier or phenol absorber, where the ammonium phenolates are decomposed, e. g., by caustic soda, and sodium phenolates formed. The ammonia and admixed water vapor then pass to the cooler or dephlegmator 28 where water vapor and some of the ammonia are condensed and the ammonia then escapes to the saturator or may be in part recycled through the pipe 32 to the free ammonia still. The condensate from the condenser or dephlegmator 28 is returned through the pipe 35 to the fixed ammonia still.

The gas liquor is preheated to 98° C. or above before entering the ammonia still to assist in preventing reabsorption of phenolate vapors when passing through the still. The liquor passing through the free ammonia still is also kept at a temperature of at least 98° C. and preferably somewhat higher, and it is brought into contact with ammonia vapors of sufficient volume to react with the phenols, forming ammonium phenolates, which we have found to be more readily volatile than the phenols themselves, and which are not reabsorbed when the temperature of the liquor is about 98° C. and when a sufficient amount of ammonia is present. The recycling of ammonia, made possible by the apparatus illustrated, enables any desired amount of the ammonia to be recycled, so that the presence of sufficient ammonia can be insured for securing complete or substantially complete driving off of the phenols as phenolates. The purification of the ammonia escaping from the still makes possible its return and enables the phenols to be recovered from it as one of the products of the process. It will be noted that the ammonia recycled through the free ammonia still is in the form of purified and partially dried vapors; while the ammoniacal liquor formed as a condensate in the condenser or dephlegmator 28 passes to the fixed ammonia section where the ammonia is evolved and passed into the bottom of the free section.

In the operation of the apparatus of Fig. 2, the temperature may be maintained in part by preheating the gas liquor to a temperature of 98° C. or higher, and in part by the reflux condenser or dephlegmator 8ᵇ, where this dephlegmator is used. The temperature of the liquor in the still, including the liquor at the top or liquor inlet portion of the still, is maintained above 98° C. and may be several degrees higher than that temperature. If the temperature of the escaping vapors is too high, so that their water vapor content is excessive, they may be cooled in the dephlegmator 8ᵇ and a considerable portion of the water vapor removed therefrom before they pass to the phenol absorber.

The apparatus of the present invention requires a relatively small outlay for added plant equipment, and but little added attention on the part of the operator. It is therefore well adapted for use in conjunction with present day ammonia stills; and it enables such stills to be operated with the overcoming of the present day objectionable character of the waste liquor and with the additional recovery, where it is desired, of phenol as a product of this process. Where waste liquor now produced cannot be discharged into streams, because of its polluting effect, and where it requires special disposal, as by pumping a considerable distance, the present process results in a waste liquor sufficiently pure to permit it to be discharged into streams with the avoidance of such nuisance.

While we have described the invention more particularly for the treatment of gas liquor, and while the invention is of special value for such treatment, and enables the present nuisance of still waste liquors to be overcome, the apparatus is applicable for the treatment of other waste liquors, and particularly liquors from processes in which phenol is employed, and which contain phenol in small amounts. The apparatus can thus be employed to advantage for the recovery of phenol present in small amounts in waste liquors from the manufacture of phenolic resins or condensation products.

We claim:

1. An ammonia still provided with heating means adapted to maintain the liquor in the still at a temperature of around 98 to 100° C. or higher, and provided with means for introducing additional ammonia to the still to increase the ammonia content of the liquor therein, whereby phenolic compounds can be driven off from the still with the ammonia.

2. An ammonia still provided with heating means for heating the still and the liquor therein to a sufficient temperature to drive off phenolic compounds with the ammonia, a purifier arranged to purify the resulting ammonia from admixed phenolic compounds, and means for returning a part or all of the resulting purified ammonia to the still.

3. An ammonia still provided with heating means, a purifier arranged to remove phenolic compounds from the ammonia vapors coming from the still, a condenser or dephlegmator for condensing part of the water vapor and ammonia and means for returning the resulting ammonical condensate to the still.

4. An ammonia still provided with heating means, a purifier arranged for purifying the ammoniacal vapors and for removing phenolic compounds therefrom, a condenser or dephlegmator for condensing a part of the water vapor admixed with the ammonia, means for returning the resulting condensate to the still, and means for returning additional uncondensed ammonia gas to the still to increase the ammonia content of the still.

5. An apparatus for distilling gas liquor and for removing and recovering ammonia and phenolic compounds therefrom, comprising a preheater for the liquor, an ammonia still having free and fixed ammonia sections together with means for heating the same, means for purifying the escaping ammonia from phenolic compounds, means for condensing water vapor from the ammonia, and for returning the condensate to the fixed ammonia still, and means for recirculating part of the purified and partially dried ammonia vapors to the free ammonia still.

6. An ammonia still provided with heating means, a purifier arranged to remove phenolic compounds from the ammonia vapors coming from the still, a condenser or dephlegmator for condensing part of the water vapor and ammonia, said condenser being cooled by indirect contact with cold liquor fed to the still, and means for returning the ammoniacal liquor from the condenser to the still.

In testimony whereof we affix our signatures.

LE ROY WILBUR HEFFNER.
WILLIAM TIDDY.